Oct. 7, 1930.  N. DAHL  1,777,913
PROCESS AND APPARATUS FOR PRODUCING COOLING LIQUIDS
Filed April 5, 1926  2 Sheets-Sheet 1
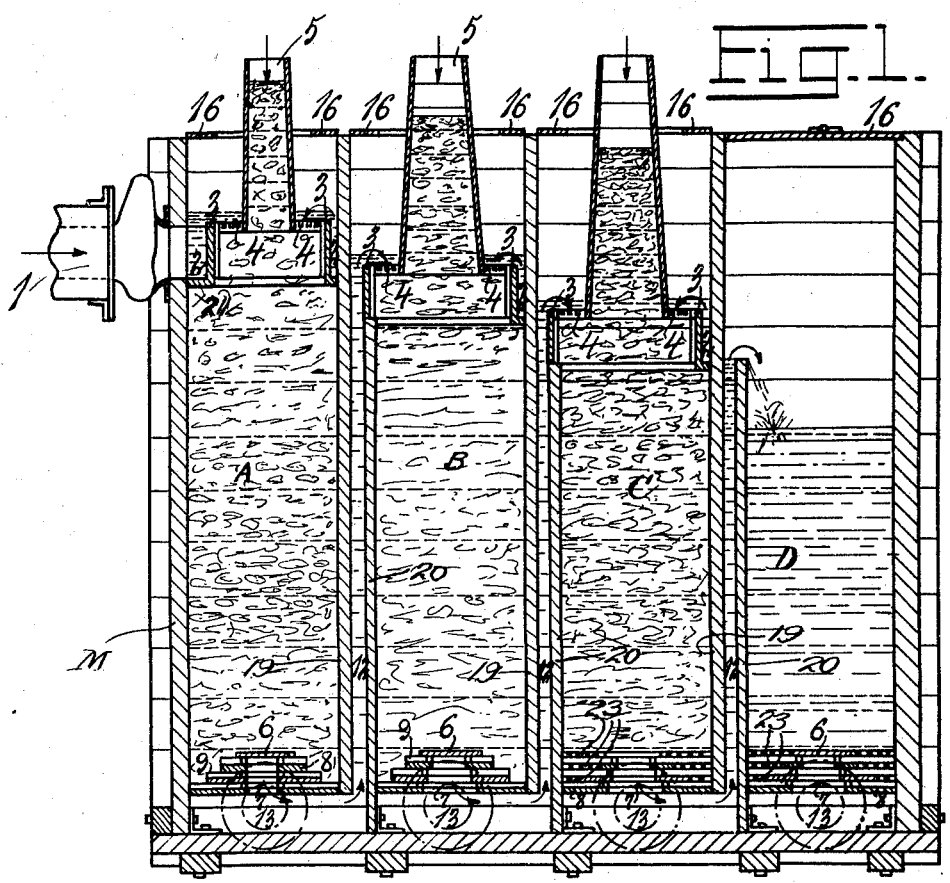
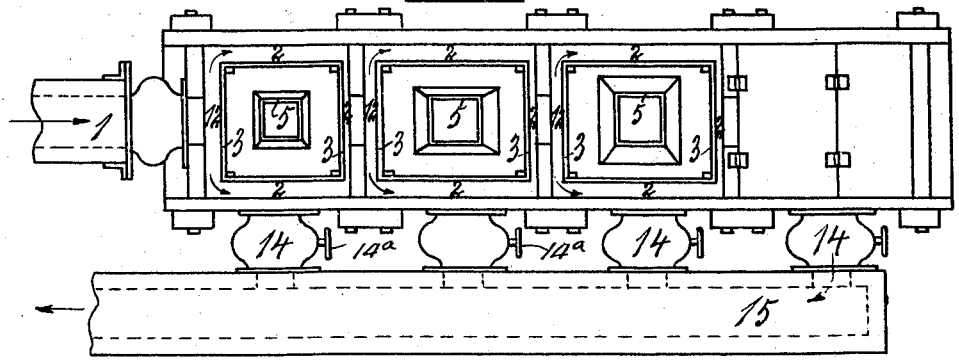
Inventor
N. Dahl
by Langner, Parry, Card & Langner
Attys.

Oct. 7, 1930.   N. DAHL   1,777,913
PROCESS AND APPARATUS FOR PRODUCING COOLING LIQUIDS
Filed April 5, 1926   2 Sheets-Sheet 2
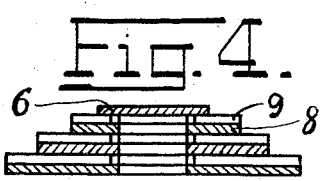
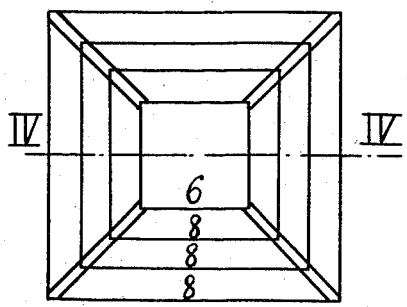
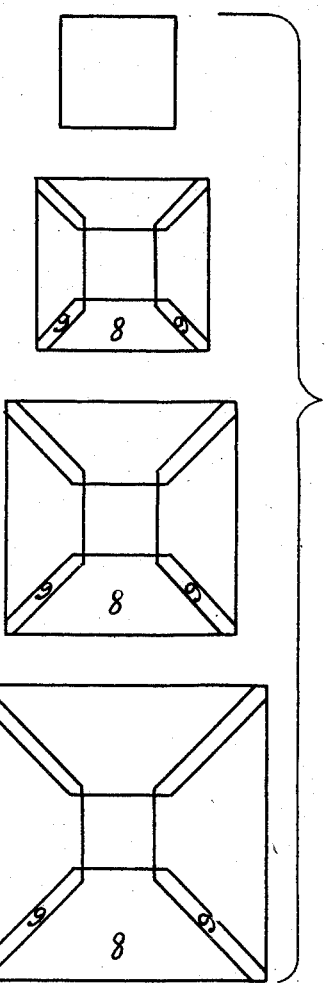
Inventor
N. Dahl
by Langner, Perry, Card & Langner
Attys.

Patented Oct. 7, 1930

1,777,913

UNITED STATES PATENT OFFICE

NEKOLAI DAHL, OF TRONDHJEM, NORWAY

PROCESS AND APPARATUS FOR PRODUCING COOLING LIQUIDS

Application filed April 5, 1926, Serial No. 99,954, and in Norway February 7, 1921.

The invention relates to an apparatus for the production of a freezing brine and more particularly to an apparatus wherein the brine is produced by circulating a salt solution through a body of ice.

One object of the invention is to provide an apparatus of this class adapted to operate in a reliable manner and to produce a brine of uniform temperature and salt content.

It is another object of the invention to provide an apparatus of this class, fitted with a novel arrangement for the inlet of the salt solution into the body of ice, whereby the salt solution will be evenly distributed throughout the mass of ice, while obviating any splashing and subsequent formation of foam as well as clogging up, as occurs with the usual nozzles and perforated tubes.

More specifically, the invention aims to devise an arrangement such that the brine will be prevented from falling upon the pieces of ice.

Another object of the invention is to provide means insuring the proper outflow of the brine from the ice container in order to prevent the brine from following a preferred path through the body of ice.

Further objects and advantages of the invention will be set forth in the following description:

An embodiment of an apparatus which is adapted for producing freezing liquid according to the invention is illustrated in the accompanying drawing, wherein:

Fig. 1 is a vertical longitudinal sectional view of the apparatus.

Fig. 2 is a top view of the apparatus.

Fig. 3 is a top view of a bottom grate.

Fig. 4 is a sectional view of the grate along the line IV—IV (Fig. 3).

Fig. 5 is a detail view of the grating, the grate sections being separated from one another.

In the example illustrated in Figs. 1 and 2, the apparatus comprises a tank M divided into four compartments A, B, C, D by means of a number of pairs of vertical partitions 19, 20. Each partition 19 extends to the top of the tank and its lower edge is slightly above the bottom of the corresponding compartment. The other partition 20 of each pair extends to the bottom of the corresponding compartment and the upper edges of the partitions 20 in the successive compartments are progressively lower.

The salt solution is introduced into the first compartment A through a pipe 1 at the top thereof. Compartment A is provided, immediately below pipe 1, with a horizontal partition 21, having a central aperture and a vertical flange 3, along the inner edge, thus forming an annular space 2 around said flange. Above said flange is mounted a grating arrangement 4, having a central aperture through which extends an ice loading chute 5 of suitable height.

Similarly, compartments B, C are provided, at the upper part, with horizontal partitions 22 of a general U shape, whose inner edges are provided with vertical flanges 3, above which are mounted gratings 4 and loading chutes 5 similar to the preceding. Each compartment has a bottom grating 6, to be further described. The salt solution delivered through pipe 1 flows through the space 2, and over the upper edge of the wall 3, acting as a weir, and passes through the horizontal grating arrangement 4; the liquid then flows downwardly through the body of ice loaded through chute 5 and traverses the grating system G at the bottom of the chamber. The liquid then collects in the bottom part 13 of compartment A, flows upwardly through the passage 12 between partitions 19 and 20 and flows over the top of flange 3 in compartment B, and then through the horizontal grating 4 of said compartment. The liquid in compartment B flows downwardly as in compartment A and, in the same manner as above described, from the bottom of compartment B through passage 12 to compartment C, from which it passes into following compartments.

In the illustrated example, the last compartment D is not supplied with ice. From this last compartment, freezing liquid is drawn off through an outlet pipe 14 opening at a short distance above the bottom. In order to enable the liquid of being passed through a greater or less number of compartments in the apparatus, said compartments are provided with similar outlet pipes 14 opening into a common collector 15. Each pipe 14 has a valve whose actuating handle is shown diagrammatically at 14ª.

In operation, the hoppers or chutes should be constantly filled with ice, so that each compartment is filled with ice up to the top grating so as to avoid the formation of foam which would take place if liquid would fall through a certain distance in the air onto the upper surface of the ice column.

It may be of advantage to introduce salt together with ice through the hoppers 5.

It will be noted that the cooling liquid reaches the horizontal grates 4 in an ascending flow and then overflows over the weir formed by flanges 3, in a general inward direction. In this manner, the formation of foam is efficiently avoided, due to the elimination of eddies, and a proper distribution of the brine throughout the body of ice is insured.

The grating arrangement at the bottom of each compartment is especially designed in order to secure an even distribution of the brine through the whole body of ice. It preferably consists of a number of superposed rectangular plates 8 with a central opening, each plate having radially arranged spacing lists or fillets.

The plates may be of decreasing size and toward the top so that the entire grating arrangement has the general shape of a pyramid with stepped outline, the upper plate 6 having no aperture. Due to this grating arrangement, the liquid is caused to pass through the grate in a substantially horizontal direction from the periphery towards the center. The ice is thereby prevented from obstructing the openings; however, if the ice cakes are tightly packed at one side, the liquid will nevertheless be discharged at the opposite side, the ice will follow the flow of liquid and the obstruction will rapidly disappear. Ordinary superposed grates may also be employed in substitution for or in addition to the plates above described. Thus, in compartments C, D, it is assumed that the grating arrangement above described is fitted at the centre of superposed grates 23 having suitable apertures for this purpose. In all cases, the bottom grate consists of one of the above described rectangular plates 8 having a central opening.

I claim:

1. An apparatus for producing a freezing liquid comprising an ice chamber, a grate in said chamber, an ice loading chute extending through said grate, means adjacent said grate for supplying liquid into the ice body through said grate, means for discharging the cooled liquid substantially at the bottom of said chamber and means for maintaining a body of liquid in said chamber, whereby a portion of the ice body is submerged in the liquid.

2. An apparatus for producing a freezing liquid comprising an ice chamber adapted to contain liquid and a body of ice partially submerged in the liquid, a substantially horizontal openwork partition adapted to restrain the ascension of the ice in and above the liquid, an ice loading chute in said partition, means for delivering liquid above and through said partition and discharge means for said liquid.

3. An apparatus for producing a freezing liquid comprising an ice chamber, an annular openwork partition horizontally disposed in said chamber, an ice loading chute in said partition and adapted to limit with said partition an annular space containing no ice, means for supplying liquid into said space and through said partition, means for maintaining liquid to a certain level in said chamber, and discharge means for said liquid.

4. An apparatus for producing a freezing liquid comprising a receptacle adapted to contain a column of ice, supply means for the liquid, surrounding said ice column below the upper level thereof, perforations around said ice column adjacent said supply means, whereby liquid is supplied from the periphery toward the centre, and means for discharging said liquid.

5. An apparatus for producing a freezing liquid comprising an ice chamber, a substantially horizontal partition having an upwardly extending flange limiting a central aperture, a grate covering said aperture, a chute for loading ice extending through said grate, means for supplying liquid into the annular channel bounded by said partition and flange, whereby liquid is caused to flow over the edge of said flange through said grate, and discharge means for the liquid.

6. An apparatus for producing a freezing liquid comprising an ice chamber adapted to contain a mass of ice, means for supplying liquid into said chamber, and a bottom member adapted to be passed through by the cooled liquid, said bottom member having substantially radial and horizontal ducts, whereby the liquid is caused to flow therethrough from the periphery toward the center.

7. An apparatus as claimed in claim 6, wherein said bottom member comprises a number of superimposed plates spaced apart by substantially radial flanges, each plate having a central aperture except the uppermost.

8. A plant for producing a freezing liquid comprising a number of ice chambers, means for circulating the liquid through said chambers successively, a common pipe for the cooled liquid, means for connecting said common pipe with the respective ice chambers and obturating means on said connecting means.

9. An apparatus for the production of freezing liquid comprising a container through which the liquid to be cooled is circulated, a plurality of gratings disposed at different heights in the container, an ice loading chute extending through the uppermost grating, between which gratings a body of ice is placed, said body of ice extending through said chute and above the uppermost grating and the said gratings being so arranged in relation to the inlet and outlet of the liquid, that the liquid enters the body of ice through the uppermost grating at a point below the top surface of the body of ice.

10. An apparatus for the production of freezing liquid in which an ice supply channel is arranged in such a manner in a container for ice and freezing liquid as to produce between the walls of the ice supply channel and the outer wall of the container an interspace communicating with a supply conduit for liquid and communicating with the space to which the ice supply channel leads through a grating arrangement.

In testimony whereof I have signed my name to this specification.

NEKOLAI DAHL.